Feb. 8, 1927.  1,616,810
O. A. LARSEN
LOUVER COVERING FOR AUTOMOBILE HOODS
Filed Sept. 27, 1924
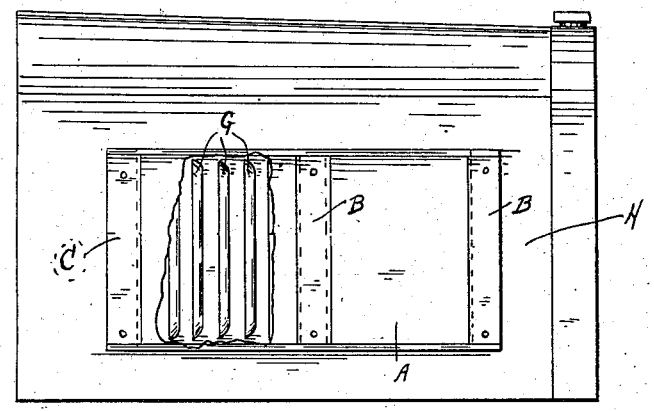
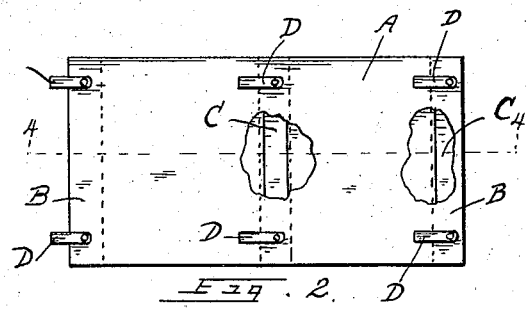
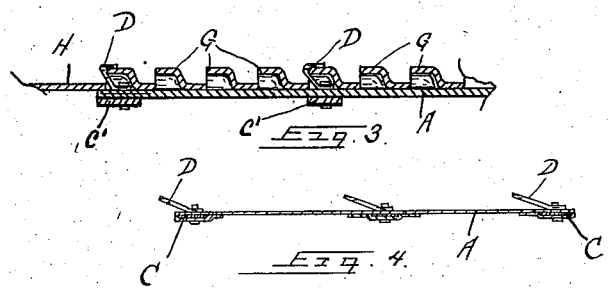
INVENTOR
Ole Alonzo Larsen
by J. M. Thomas
Attorney Patented Feb. 8, 1927.

1,616,810

UNITED STATES PATENT OFFICE.

OLE ALONZO LARSEN, OF SALT LAKE CITY, UTAH.

LOUVER COVERING FOR AUTOMOBILE HOODS.

Application filed September 27, 1924. Serial No. 740,261.

My invention relates to hood covers, and has for its object to provide a detachable cover for the louver openings in the side walls of an automobile hood which will aid in keeping the temperature above the freezing point in cold weather.

These objects I accomplish with the device illustrated in the accompanying drawings, in which similar letters of reference indicate like parts throughout the several views, and as described in the specification forming a part of this application and pointed out in the appended claims.

In the drawings in which I have shown the best and most substantial embodiment of my invention, Figure 1 is an elevation of the inner face of the engine hood of an automobile with my device in place thereon; Figure 2 is an elevation in detail of one of my devices. Figure 3 is a longitudinal section showing a modification in the construction of the invention. Figure 4 is a longitudinal section on line 4—4 of Figure 2.

The present invention consists of a sheet or curtain of flexible air-proof material A, having a plurality of transverse stiffening strips C attached thereto, or, if canvas is used for the sheet A, then hems B may be sewed therein and a sheet of stiffening material, such as tin, aluminum, celluloid, or other pliant but non-collapsible material, may be used in said hems to prevent the sagging and wrinkling of the said sheet A. Clamps D are fastened on said sheet, with portions of each clamp passed through the end portions of each of said stiffeners C. Each of said clamps D consists of a thin strap of metal which has one end thereof fastened by a rivet, or wing portion of the strap bent at right angles to engage both folds of the sheet A, and through the stiffening material C, thereby holding the said sheet A and the stiffeners C together.

To fasten my device in place on the inner face and covering the louver openings G of the hood H, the free end of said straps D are passed through the louver opening nearest the radiator of an automobile hood, and the other clamps have their free ends passed through the louver openings which are respectively contiguous; then by moving said sheet A longitudinally as to said hood H, the said free ends of each of said straps D will engage the edge of the louver slot. The free end portions of the said straps D may be bent back toward the radiator of the car to engage the edge of the said louver slots and hold the device in place. I do not confine my invention to the construction shown, as slight modifications may be made within the scope of the claims without departing from the spirit of the invention. In Figure 3 I have shown a modification of my invention, wherein the stiffening strips C' are secured to said sheet A by rivets passed through the straps D, sheet A and stiffeners C'.

Having thus described my invention, I desire to secure by Letters Patent and claim:—

1. A louver closure for automobile hoods comprising a sheet of flexible material; a plurality of stiffening strips secured transversely and at spaced apart intervals to said sheet; and metal straps having one end fastened to said sheet and stiffening strips, and the other end portion adapted to be bent over the edge of the adjacent louver opening.

2. A louver closure for automobile hoods comprising a sheet of flexible material having transverse pockets formed therein and parallel with the louver openings, a plurality of stiffening strips secured in said pockets by rivets and adapted to be parallel with the louver openings when on the hood of an automobile; and a plurality of metal straps having one end fastened to said sheets and stiffening strips by rivets, and the other end adapted to be bent over the edge of the louver opening to hold said flexible sheet closely against the said automobile hood.

In testimony whereof I have affixed my signature.

OLE ALONZO LARSEN.